(12) United States Patent
Mege et al.

(10) Patent No.: US 8,488,718 B2
(45) Date of Patent: Jul. 16, 2013

(54) CORRECTION OF DISTORTIONS IN AN EMISSION CHAIN

(75) Inventors: Philippe Mege, Bourg la Reine (FR); Christophe Brutel, Cagnes (FR); Pierre-Yves Le Gal, Loperhet (FR)

(73) Assignee: Eads Secure Networks, Elancourt (FR)

( * ) Notice: Subject to any disclaimer, the term of this patent is extended or adjusted under 35 U.S.C. 154(b) by 954 days.

(21) Appl. No.: 12/196,507

(22) Filed: Aug. 22, 2008

(65) Prior Publication Data

US 2009/0074105 A1    Mar. 19, 2009

(30) Foreign Application Priority Data

Aug. 23, 2007  (FR) ..................................... 07 05980

(51) Int. Cl.
*H04L 25/49*  (2006.01)
*H04L 27/20*  (2006.01)
(52) U.S. Cl.
USPC ......................................... 375/297; 375/308
(58) Field of Classification Search
USPC ................. 375/261, 269, 272, 278–281, 284, 375/285, 295–298, 303, 308; 332/103, 145; 455/114.3
See application file for complete search history.

(56) References Cited

U.S. PATENT DOCUMENTS

| | | | | |
|---|---|---|---|---|
| 6,583,739 | B1 * | 6/2003 | Kenington | 341/118 |
| 6,934,341 | B2 * | 8/2005 | Sahlman | 375/297 |
| 2005/0153669 | A1 * | 7/2005 | Suzuki et al. | 455/103 |
| 2009/0251211 | A1 * | 10/2009 | Martin et al. | 330/149 |

* cited by examiner

*Primary Examiner* — Young T. Tse
(74) *Attorney, Agent, or Firm* — Patzik, Frank & Samotny Ltd.

(57) ABSTRACT

An emission chain, comprising a processing pathway for an input signal which includes a digital signal decomposition according to N signal components, with N an integer greater than or equal to 2. The N signal components being converted from a digital form into an analog form and following distinct physical pathways that induce first respective delays on the N signal components. A delayed input signal is obtained by applying a second delay ($\tau$) having a value greater than or equal to the maximum value of the first delays. Next, N correction delays ($\tau-\tau_i$) are applied respectively to the N signal components based on a comparison between said input signal delayed by the second delay and the signal to be emitted. Finally, the signal to be provided to a power amplifier is obtained by combining the N signal components obtained on completion of the previous step.

10 Claims, 3 Drawing Sheets

CORRECTION OF DISTORTIONS IN AN EMISSION CHAIN

FIELD OF THE INVENTION

The present invention pertains to an emission chain for radio transmission in which distortions of the signal to be processed are introduced, and more particularly to the correction of certain of these distortions.

BACKGROUND OF THE INVENTION

Certain emission chains are suitable for receiving an input signal, then decomposing it into at least one first and one second signal component which each follow at least in part, in an analog form, a different physical pathway and may possibly undergo different processing operations, before these two signal components thus processed in a parallel manner are combined to provide a signal to be emitted.

The various physical pathways traversed may induce different delays on each of the signal components thus processed in parallel. In addition to these differential delays, the fact that the various signal components follow different physical pathways may generate additional distortions such as for example differences in gain, or differences in phase, or else any other type of distortion, between these various components of the signal to be emitted.

These various potential signal distortions are liable to degrade the characteristics of the signal emitted, such as for example the frequency spectrum of the signal emitted. They are also liable to have an impact on the performance of a suitable receiver for receiving the signal emitted by the emission chain.

FIG. 1 illustrates an example of such an emission chain which comprises a signal decomposition module 101 suitable for receiving a digital input signal 100 provided by a modulator, and for providing, on the one hand, a first signal component 307, corresponding here to an amplitude modulation component (AM) and, on the other hand, a second signal component 308, corresponding to a phase modulation component (PM).

These first and second signal components are respectively processed in parallel. The first and second outputs of the signal decomposition module 101 are linked respectively to two digital analog converters 102 and 103. An output of the digital analog converter 103 is linked to a phase modulator 104. The latter is suitable for modulating an input signal according to a carrier frequency.

This emission chain comprises a power amplifier 105 which is suitable for receiving, on the one hand, on a first input a signal 110 provided at the output of the digital analog converter 102 relating to the amplitude component of the input signal 100, and, on the other hand, on a second input a signal 111 provided at the output of the phase modulator 104 relating to the phase component of the input signal 100.

The first and second inputs of the power amplifier may correspond respectively to the drain and gate inputs of this power amplifier.

Next, at the output of this power amplifier, a signal to be emitted 112 by the emission chain is thus obtained on the basis of the two signal components cited above.

Here, it may in particular be noted that a delay between these two components of the signal to be emitted may induce a degradation of the spectrum of this signal 112.

FIG. 2 provides another example of a part of an emission chain in which the signal to be transmitted is decomposed into two signal components according to a so-called "quadrature" decomposition.

This emission chain comprises a decomposition module 601 for decomposing a signal received at input, into first and second phase quadrature signal components, I and Q respectively. The signal is therefore represented in complex form, the real and imaginary parts forming the two quadrature components of the signal.

This decomposition module 601 exhibits a first output pathway which provides the first component I as input to a first digital/analog converter 602 and a second output pathway which provides the second component Q to a second digital/analog converter 603. At the output of these analog/digital converters, the first and second analog quadrature signal components are processed by an I/Q modulator 604 in such a way that they are transposed to the carrier frequency. After this modulation processing, the signal is then provided as input, or more precisely on the gate, of a power amplifier 105, the latter being suitable for providing a signal to be emitted.

In such an architecture, distortions may be induced by the digital/analog converters 602 and 603, as well as by the IQ modulator 604. These converters, this IQ modulator, with the different physical pathways traversed by the two analog components, may introduce a delay between the components I and Q in the signal obtained at the output of the IQ modulator.

A defect relating to poor balance (or "imbalance") may also appear in this type of emission chain architecture, this defect being based on a difference between the gains of the two pathways I and Q.

A quadrature defect may also be detected, the signal components I and Q not being perfectly in quadrature.

The present invention aims to improve the situation in various cases, in particular such as those illustrated by the two examples described above.

An emission chain structure, such as that illustrated by the examples above, is known to the person skilled in the art. On the basis of the knowledge of this structure, it is advantageously possible to correct distortions which are inherent to this structure by virtue of a digital preprocessing. Such a digital preprocessing makes it possible to correct and to obtain at the output of the power amplifier of the emission chain, a radio signal corresponding to the signal that one wishes to transmit and exhibiting improved performance in particular as regards the distortion of the frequency spectrum.

SUMMARY OF THE INVENTION

A first aspect of the present invention proposes a method of processing a signal in an emission chain suitable for receiving an input signal and for providing a signal to be emitted;
said emission chain comprising a processing pathway for the input signal which includes a digital signal decomposition according to N signal components, with N an integer greater than or equal to 2, said N signal components being converted from a digital form into an analog form and following respectively distinct physical pathways, said physical pathways inducing first respective delays $\tau_i$ on the N signal components; said input chain comprising a power amplifier;
said method comprising the following steps:
 /a/ obtaining a delayed input signal by applying a second delay ($\tau$) having a value greater than or equal to the maximum value of the first delays;
 /b/ applying N correction delays ($\tau-\tau_i$) respectively to the N signal components; and /c/ obtaining the signal to be provided to the power amplifier by combining the N signal components obtained on completion of step /b/.

By virtue of these provisions, it is possible to obtain a signal to be provided as input to the amplifier which is corrected of certain disturbances induced by the structure of the emission chain considered. Indeed, by applying delays to the components of the digital input signal before combining them in the emission chain it is possible to correct the differential delays induced by the architecture of the emission chain considered.

The person skilled in the art knows how to estimate the maximum value that may be taken by these various first delays, on the basis of the physical characteristics of the components used on the various physical pathways.

He consequently knows how to determine a value of the second delay.

In an embodiment of the present invention, it may be envisaged that the N correction delays $(\tau-\tau_i)$ to be applied respectively to the N signal components are determined on the basis of a comparison between input signal delayed by the second delay $\tau$ and the signal to be emitted.

The determination of the correction delays $\tau_i$ may be implemented regularly over time.

In an alternative, it may be envisaged that, in step /b/, the delays are applied by implementing a linear interpolation and that the linear interpolation coefficients are estimated on the basis of a comparison between the input signal delayed by the second delay and the signal to be emitted.

In this case, the linear interpolation coefficients may advantageously be estimated by means of a gradient algorithm.

When N is equal to 2, the input signal may be decomposed into a first and a second signal component, the first signal component and the second signal component of the input signal being respectively amplitude component and a phase component.

When N is equal to 2, the input signal may also be decomposed into a first and a second signal component, the first and second signal components of the input signal being phase quadrature components.

By proceeding in this manner, it is advantageously possible to also correct the gains corresponding to these various components, or else their relative phase shift, or any other distortion due to the architecture of the emission chain.

A second aspect of the present invention proposes a chain for processing a signal in an emission chain, comprising means suitable for implementing a method of processing according to the first aspect of the present invention.

Other aspects, aims and advantages of the invention will become apparent on reading the description of one of its embodiments.

DETAILED DESCRIPTION OF THE DRAWINGS

The invention will also be better understood with the aid of the drawings, in which.

DETAILED DESCRIPTION OF THE INVENTION

The following sections describe the implementation of the present invention in various emission chain architectures.

Figure 3:
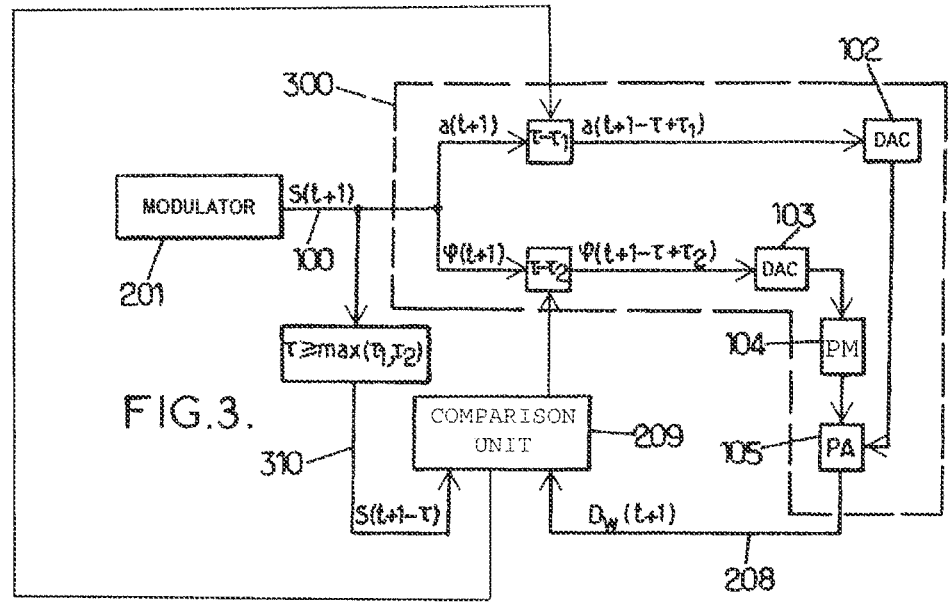
FIGS. 3 and 4 illustrate an implementation of a distortion correction according to an embodiment of the present invention in an architecture such as that illustrated in FIG. 1.

As illustrated in FIG. 3, a processing chain according to an embodiment of the present invention is suitable for receiving the input signal 100 and for providing the signal to be emitted 208. It comprises:

a processing pathway 300 for the input signal, which comprises a power amplifier 105, and which includes a digital signal decomposition according to N signal components, with N an integer greater than or equal to 2, said N signal components, on the one hand, being converted from a digital form into an analog form and, on the other hand, following respectively distinct physical pathways, said physical pathways inducing first respective delays on the N signal components;

a signal transmission pathway 310 suitable for delaying the input signal by a second delay $\tau$ and for transmitting the delayed input signal to a comparison unit 209, said second delay $\tau$ having a value greater than or equal to the maximum value of the first delays;

a return pathway which transmits the signal to be emitted 208 to said comparison unit 209.

In the example illustrated here N is equal to 2, and the first delays are referenced $\tau_1$ and $\tau_2$.

The signal output from the power amplifier 105 corresponds to a signal arising from a combination of the N signal components delayed respectively by N correction delays $\tau-\tau_i$, for i between 1 and N, the signal provided being obtained on the basis of a comparison between the delayed input signal and the signal to be emitted, performed by the comparison unit 209

Regardless of the processing applied to an input signal 100 to provide a signal to be emitted 208, an emission chain according to an embodiment of the present invention exhibits an input signal processing pathway 300 as well as, on the one hand, a transmission pathway 310 providing the input signal from the modulator 201 to a signal comparison unit 209, and, on the other hand, a return pathway providing as input to the signal comparison unit 209 the signal to be emitted 208, seen through said return pathway.

The signal comparison unit 209 is responsible for determining the delays to be applied to each of the signal components so as to correct the distortions of the signal to be emitted which are induced by a relative desynchronization of these signal components.

Figure 1:
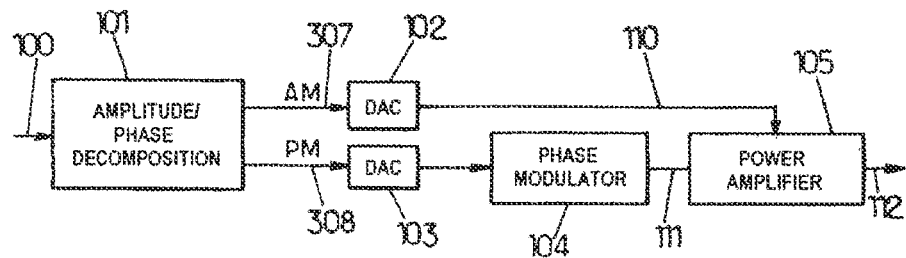
FIG. 1 illustrates a part of an emission chain in which the signal processed is decomposed into several signal components, according to a first signal decomposition by amplitude and by phase.

FIG. 3 illustrates a distortion correction according to an embodiment of the present invention in an emission chain architecture such as that which is illustrated in FIG. 1.

In such an architecture, there is provision to apply a first correction delay $\tau-\tau_1$ and a second correction delay $\tau-\tau_2$ to the first and second signal components respectively, so as to apply a relative correction of the signal components and thus allow a relevant recombination of these signal components.

After decomposing the signal into two signal components, the amplitude component is delayed by the first correction delay and the phase component is delayed by the second correction delay.

By proceeding in this manner, the signal to be emitted arising from the combining of the two signal components may advantageously be corrected of the aforesaid distortions.

In order to determine a relevant value for these first and second correction delays, there is provision to apply a delay $\tau$ to the input signal and to compare the input signal thus delayed with the signal emitted 208 which arises from a recombining of the signal components processed and which is observed through the return pathway.

The initial value of the delay $\tau$ is firstly chosen to be greater than or equal to the maximum value that may be taken by the first and second delays $\tau_1$ and $\tau_2$, which are liable to affect the first and second processing pathways of the emission chain considered.

Thus, there is provided, in the architecture of an emission chain according to an embodiment of the present invention, a signal comparison unit 209 which receives on a first input the input signal delayed by the delay $\tau$ on the transmission pathway 310 and on a second input the signal to be emitted 208 observed through the return pathway.

On the basis of this comparison, it is possible to determine respective values for the first and second correction delays.

The two digital components of the signal are corrected respectively by delays of $\tau-\tau_1$ and $\tau-\tau_2$, the values of which emanate from the signal comparison unit 209 described above. Next, the digital components are converted into analog respectively by the converters 102 and 103 and, the corresponding analog signals not traversing the same physical pathway, these analog components undergo respectively a delay of $\tau_1$ in the case of the first analog component and of $\tau_2$ in the case of the second analog component.

After applying the first and second processing operations to the first and second signal components respectively, the digital signal components respectively obtained and provided respectively to the converters 102 and 103 may be written in the form:

$$a(t+1-\tau+\tau_1) \text{ and}$$

$$\phi(t+1-\tau+\tau_2)$$

After traversing their respective physical pathways, the two components which are provided to the power amplifier (PA) undergo a respective delay of $\tau_1$ and $\tau_2$, and hence the components applied to the power amplifier (PA) are:

$$a(t+1-\tau) \text{ and}$$

$$\phi(t+1-\tau)$$

Thus the corrections made to the various components of the digital signals make it possible to obtain signal components that are synchronized at the level of the power amplifier (PA) and hence an optimized emitted signal.

It is assumed that the maximum values that may be taken respectively by the first and second delays $\tau_1$ and $\tau_2$ are known or else that means are available for estimating these values.

It should be noted that from this embodiment, it is easy to deduce a suitable embodiment for application to an amplitude/frequency decomposition. In this case, it suffices to replace the phase modulator with a frequency modulator 104, since various types of angular modulation are equivalent, and in particular a phase modulation and a frequency modulation. Thus, what is applicable to one type of angular modulation is also applicable to another type of angular modulation, in particular a delay on the phase modulation component of a signal is equivalent to a delay on the equivalent frequency modulation component of the same signal.

To estimate the delays undergone by the phase and amplitude components of the signal in the emission chain, various estimation procedures may be used here.

Figure 4:
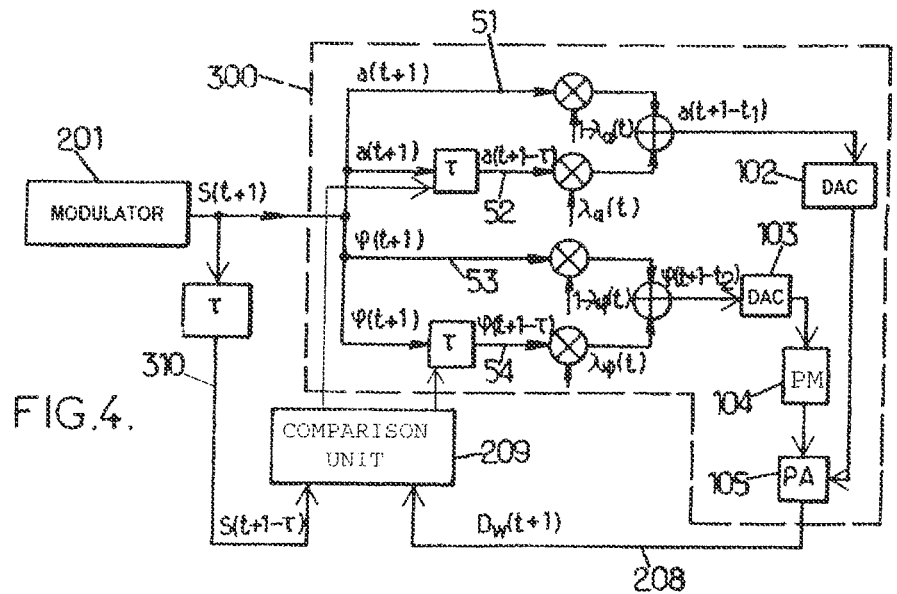

These delays may in particular be estimated iteratively using a gradient algorithm. In this case, a linear interpolation may be implemented to provide an approximation of a delay to be applied to a signal or signal component. FIG. 4 illustrates such an embodiment.

The following equations may be written:

$$a(t-(\tau-\tau_1)) \approx a(t) \cdot (1-\lambda_a(t)) + a(t-\tau) \cdot \lambda_a(t)$$

and $$\phi(t-(\tau-\tau_2)) \approx \phi(t) \cdot (1-\lambda_\phi(t)) + \phi(t-\tau) \cdot \lambda_\phi(t)$$

where $a(t)$ represents the amplitude component of the signal; and where $\phi(t)$ represents the phase component of the signal; and where $\lambda_a$ and $\lambda_\phi$ are linear interpolation coefficients, respectively amplitude and phase components of the signal; and where $\tau$ is a constant delay value at least equal to the largest possible value of the delays $\tau_1$ and $\tau_2$.

In an embodiment of the present invention, the interpolation coefficients $\lambda_a(t)$ and $\lambda_\phi(t)$ take real values and are obtained by implementing a gradient algorithm. As known to the person skilled in the art, the application of the linear interpolation as defined above corresponds to applying a delay whose value lies between 0 and $\tau$ to the original signal.

The linear interpolation cited above is a simple case of Lagrange interpolation, as described in the document accessible at:
http://sal.shs.arizona.edu/~smathur/pubs/Thesis/MathurCh3.pdf.

When the iterative gradient algorithm converges, we have:

$$\lambda_a \approx \frac{(\tau-\tau_1)}{\tau} \text{ and } \lambda_\phi \approx \frac{(\tau-\tau_2)}{\tau}$$

The amplitude component of the input signal is processed on a first 51 and a second 52 correction pathway and the phase component of the input signal is processed on a third 53 and a fourth 54 correction pathway.

A weighting correction coefficient $(1-\lambda_a(t))$ is applied to the amplitude component $a(t+1)$ on the first correction pathway 51.

A delay $\tau$ is applied on the second correction pathway 52, and then a weighting correction coefficient $\lambda_a(t)$ is applied to the delayed amplitude component.

By summing these first and second correction pathways, a corrected signal component is obtained which satisfies the following equation:

$$S_{cor.1}(t+1) \approx a(t+1-t_1)$$

When the iterative gradient algorithm converges, the term $t_1$ is according to the following equation $$t_1 = \tau - \tau_1$$

By proceeding in a similar manner on the phase component $\phi(t+1)$ in relation to the third and fourth correction pathways of the correction module, a weighting correction coefficient $(1-\lambda_\phi(t))$ is applied on the third correction pathway and a weighting correction coefficient $\lambda_\varphi$ is applied to the phase component shifted in time with a delay $\tau$. A second corrected signal component $S_{cor.2}$ which satisfies the following equation:

$$S_{cor.2} \approx \phi(t+1-t_2)$$

is then obtained by summing the signals arising from the third and fourth correction pathway.

When the iterative gradient algorithm converges, the term $t_2$ is according to the following equation $$t_2 = \tau - \tau_2$$

Next, on the basis of these two corrected signal components, a corrected signal $S'(t)$ is obtained by recombination. The recombined signal satisfies the following equation:

$$S'(t+1) = (a(t+1)(1-\lambda_a(t) + a(t+1-\tau)\lambda_a(t)) \cdot e^{j\cdot(\phi(t+1)\cdot(1-\lambda_\varphi(t)) + \phi(t+1-\tau)\cdot\lambda_\varphi(t))}$$

$S'(t)$ is similar to the power amplifier's complex input signal.

In order to seek to minimize, as a function of $\lambda_a$ and $\lambda_\varphi$, the following quadratic error:

$$e^2 = \|e(t+1)\|^2 = \|S(t+1-\tau) - D_w(t+1)\|^2$$

provision may be made to determine the values of $$\frac{\partial D_w^*(t+1)}{\partial \lambda_a(t+1)} \text{ and } \frac{\partial D_w^*(t+1)}{\partial \lambda_\varphi(t+1)}$$

which represent the derivatives of the conjugate of the signal to be emitted respectively with respect to $\lambda_a$ and $\lambda_\varphi$.

For this purpose, the following equations are written, complying with the rules for differentiating with respect to a complex variable:

$$\frac{\partial D_w^*(t+1)}{\partial \lambda_a(t+1)} = \frac{\partial D_w^*(t+1)}{\partial S'(t+1)} \cdot \frac{\partial S'^*(t+1)}{\partial \lambda_a(t+1)} \text{ and}$$

$$\frac{\partial D_w^*(t+1)}{\partial \lambda_\varphi(t+1)} = \frac{\partial D_w^*(t+1)}{\partial S'(t+1)} \cdot \frac{\partial S'^*(t+1)}{\partial \lambda_\varphi(t+1)}$$

By making the following approximation to the derivative of the output of the power amplifier by its input. This is an approximation since the precise response of the power amplifier is not generally known, in particular when the latter is working in a nonlinear zone.

The approximation follows the following equation:

$$\frac{\partial D_w^*(t+1)}{\partial S(t+1)} \approx \frac{D_w^*(t+1)}{S^*(t+1)} \quad (1)$$

the equation which follows may be written:

$$\frac{\partial D_w^*(t+1)}{\partial \lambda_a(t+1)} \approx \frac{D_w^*(t+1)}{S'^*(t+1)} \cdot \frac{\partial S'^*(t+1)}{\partial \lambda_a(t+1)}$$

The gradient for $\lambda_a$ can then satisfy the following equation, in which the gradient and the quadratic error are real numbers:

$$\lambda_a(t+1) = \lambda_a(t) + \mu_a \cdot \operatorname{Re}\left(e(t+1) \cdot \frac{D_w(t+1)}{a(t-(\tau-\tau_1))} \cdot (a(t-\tau) - a(t))\right)$$

In the same manner for $\lambda_\varphi$, the following equation may be written:

$$\frac{\partial D_w^*(t+1)}{\partial \lambda_\varphi(t+1)} \approx -j D_w^*(t+1) \cdot (\varphi(t-\tau) - \varphi(t))$$

The gradient for $\lambda_\varphi$ satisfies the following equation, in which the gradient and the quadratic error are real numbers:

$$\lambda_\varphi(t+1) = \lambda_\varphi(t) + \mu_\varphi \cdot \operatorname{Im}(e(t+1) \cdot D_w^*(t+1) \cdot (\phi(t-\tau) - \phi(t)))$$

In order to increase the stability of the gradient algorithm and to accelerate its convergence, it is advantageously possible to limit the range of excursion of $\lambda_a$ and $\lambda_\varphi$ between 0 and 1 in the course of the execution of the algorithm.

It is also advantageously possible to initialize $\lambda_a$ to any value between 0 and 1. It is likewise advantageously possible to initialize $\lambda_\varphi$ to any value between 0 and 1.

The performance obtained in such an embodiment depends on the precision of the linear approximation made. It should be noted that this precision may be increased when the frequency of the signal on the return link 208 is relatively large.

Provision may also be made to obtain the values $\lambda_a$ and $\lambda_\varphi$ by a procedure other than that which consists in linearly interpolating the phase and amplitude components of the signal. For this purpose it is in particular possible to use an interpolation procedure by means of a cardinal sinus function, using the values $\lambda_a$ and $\lambda_\varphi$ already obtained.

It is thus possible to improve the interpolation performance while maintaining low complexity for estimating the delays and retaining very good speed of convergence.

The parameters $\lambda_a$ and $\lambda_\varphi$ applied to the signal to be transmitted may possibly also be updated only from time to time, for example every frame. On the other hand, a current value of these parameters must be calculated more speedily to allow the convergence of the gradient algorithm.

Figure 2:
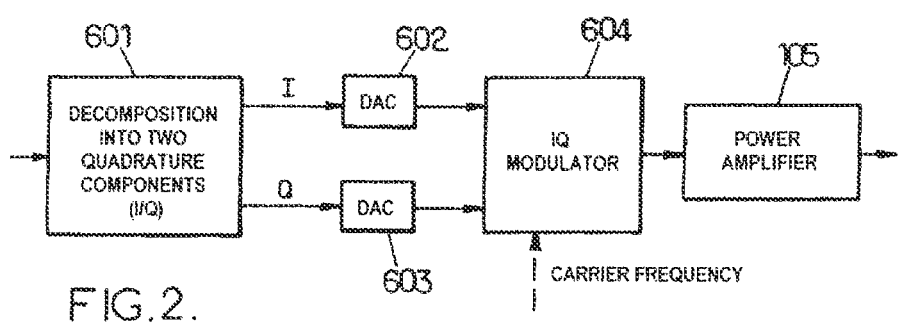
FIG. 2 illustrates a part of an emission chain in which the signal processed is decomposed into several signal components, according to a second signal decomposition into I and Q quadrature components.
Figure 5:
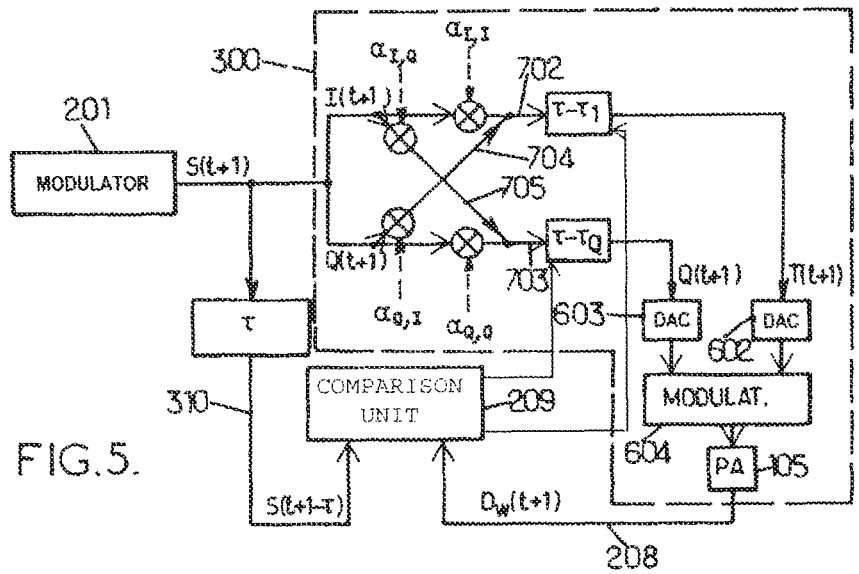
FIG. 5 illustrates an architecture of a radio signal emission chain according to an embodiment of the present invention such as illustrated in FIG. 2.

FIG. 5 illustrates an implementation of a distortion correction according to an embodiment of the present invention in an emission chain architecture including a phase quadrature signal decomposition as illustrated in FIG. 2.

In such an architecture, correction principles similar to those stated with reference to FIGS. 3 and 4 are applied here.

The following sections describe an embodiment of the present invention applied to an architecture in which the signal processed by the emission chain considered is decomposed into first and second quadrature amplitude modulation components, as illustrated in FIG. 2.

The following sections describe an embodiment of the present invention in which account is taken of the following defects in the architecture described above:
 a relative delay between the I and Q pathways;
 a balance defect; and
 a quadrature defect.

FIG. 5 illustrates an implementation of the present invention in an emission chain architecture as illustrated in FIG. 2.

A modulator 201 provides a signal $S(t+1)$. This signal is decomposed into two quadrature components respectively I and Q. The delay undergone by the first signal component is denoted $\tau_I$ and the delay undergone by the second signal component is denoted $\tau_Q$.

A first weighting correction coefficient $\alpha_{I,I}$ is applied to the component I(t+1) on a first correction pathway 702. Next, the signal thus obtained is delayed by a delay $\tau-\tau_I$.

A mixing link 704 links the second correction pathway 703 to the first correction pathway 702 in such a way that the second component Q(t+1) is mixed with the first component I(t+1) after a second weighting correction coefficient $\alpha_{Q,I}$ has been applied to this second component Q(t+1).

Thus, the second signal component Q(t+1), to which this second weighting correction coefficient $\alpha_{Q,I}$ has been applied via the first mixing pathway 704, is injected onto this first correction pathway 702, after applying the first weighting correction coefficient. Next, the signal component I'(t+1) then obtained on this first correction pathway, after applying a delay of $\tau-\tau_I$, is provided to the first digital/analog converter.

A third weighting correction coefficient $\alpha_{Q,Q}$ is applied to the second signal component Q(t+1).

There is provision for a second mixing link 705 which is suitable for providing the first signal component I(t+1) to which a fourth weighting correction coefficient $\alpha_{I,Q}$ has been applied on the second correction pathway after the third weighting correction coefficient has been applied to the second signal component Q(t+1). A delay $\tau-\tau_Q$ is thereafter applied to the signal Q'(t+1) thus obtained.

Thus, in a symmetric manner to the first correction pathway, the second signal component Q(t+1) to which this fourth weighting correction coefficient $\alpha_{Q,I}$ has been applied via the second mixing pathway 705 is injected onto this second correction pathway 703, after applying the third weighting correction coefficient. Next, the signal component Q'(t+1) then obtained on this second correction pathway 703 is provided, after applying a delay $\tau-\tau_Q$, to the second digital/analog converter.

Thus, the modulated signal S(t+1) is divided into two quadrature components I(t+1) and Q(t+1), and satisfies the following equation:

$$S(t+1)=I(t+1)+j\cdot Q(t+1)$$

The poor balance and poor quadrature defects may thus be corrected by means of the weighting correction coefficients $\alpha_{I,I}$, $\alpha_{Q,Q}$, $\alpha_{I,Q}$ and $\alpha_{Q,I}$, respective values of these coefficients being determined on the basis of a comparison of the delayed input signal S(t+1−τ) and of the signal emitted at the output of the power amplifier and seen through a return pathway.

Once the poor balance and poor quadrature defects have been corrected, and when the delays have been applied to these two components so as to synchronize them with one another and with the input signal S(t+1−τ), to the first and second signal component I and Q, then the first corrected signal component I'(t+1) and the second corrected signal component Q'(t+1) are obtained, satisfying the following equations respectively:

$$I'(t+1)=\alpha_{I,I}\cdot I(t+1-(\tau-\tau_I))+\alpha_{Q,I}\cdot Q(t+1-(\tau-\tau_I))$$

and $$Q'(t+1)=\alpha_{I,Q}\cdot I(t+1-(\tau-\tau_Q))+\alpha_{Q,Q}\cdot Q(t+1-(\tau-\tau_Q))$$

The corrected modulated signal according to an embodiment of the present invention therefore satisfies the following equation:

$$S'(t+1)=I'(t+1)+j\cdot Q'(t+1)$$

The values of the delays induced on the two signal components $\tau_I$, $\tau_Q$, and the values of weighting correction coefficients $\alpha_{I,I}$, $\alpha_{Q,Q}$, $\alpha_{I,Q}$ and $\alpha_{Q,I}$ may be obtained by various procedures.

It is for example possible to estimate these values of $\tau_I$, $\tau_Q$, and of $\alpha_{I,I}$, $\alpha_{Q,Q}$, $\alpha_{I,Q}$ and $\alpha_{Q,I}$ by implementing a gradient algorithm. In this case, as described above within the context of a signal decomposition into an amplitude component and a phase component, it is possible to use a linear interpolation to perform a time shift so as to determine interpolation parameters corresponding to the values of the delays $\tau-\tau_I$ and $\tau-\tau_Q$.

Interpolation parameters $\lambda_I$ and $\lambda_Q$ are then estimated respectively for the temporal interpolation corresponding to the first correction delay $\tau-\tau_I$ in the case of the first signal component I and corresponding to the second correction delay $\tau-\tau_Q$ in the case of the second signal component Q.

When the algorithm converges we have:

$$\lambda_I \approx \frac{(\tau-\tau_I)}{\tau} \text{ and } \lambda_Q \approx \frac{(\tau-\tau_Q)}{\tau}$$

To minimize, as a function of $\lambda_I$, $\lambda_Q$, $\alpha_{I,I}$, $\alpha_{Q,Q}$, $\alpha_{I,Q}$ and $\alpha_{Q,I}$, the value of the following quadratic error:

$$e^2=\|e(t+1)\|^2=\|S(t+1-\tau)-D_w(t+1)\|^2$$

it is possible to firstly determine $$\frac{\partial D_w^*(t+1)}{\partial \lambda_I(t+1)} \text{ and } \frac{\partial D_w^*(t+1)}{\partial \lambda_Q(t+1)}$$

Thus, the following respective equations are obtained:

$$\frac{\partial D_w^*(t+1)}{\partial \lambda_I(t+1)} = \frac{\partial D_w^*(t+1)}{\partial S'(t+1)} \cdot \frac{\partial S'^*(t+1)}{\partial \lambda_I(t+1)} \text{ and}$$

$$\frac{\partial D_w^*(t+1)}{\partial \lambda_Q(t+1)} = \frac{\partial D_w^*(t+1)}{\partial S'(t+1)} \cdot \frac{\partial S'^*(t+1)}{\partial \lambda_Q(t+1)}$$

By making the same approximation as that obtained in equation [1], the following equation is obtained:

$$\frac{\partial D_w^*(t+1)}{\partial \lambda_I(t+1)} \approx \frac{D_w^*(t+1)}{S'^*(t+1)} \cdot \frac{\partial S'^*(t+1)}{\partial \lambda_I(t+1)}$$

It is therefore consequently possible to write:

$$\frac{\partial D_w^*(t+1)}{\partial \lambda_I(t+1)} \approx$$

$$\frac{D_w^*(t+1)}{S'^*(t+1)} \cdot (\alpha_{I,I} \cdot (I(t+1-\tau)-I(t+1))+\alpha_{Q,I} \cdot (Q(t+1-\tau)-Q(t+1)))$$

$$\frac{\partial D_w^*(t+1)}{\partial \lambda_Q(t+1)} \approx \frac{D_w^*(t+1)}{S'^*(t+1)} \cdot (-j) \cdot$$

$$(\alpha_{I,Q} \cdot (I(t+1-\tau)-I(t+1))+\alpha_{Q,Q} \cdot (Q(t+1-\tau)-Q(t+1)))$$

It is then possible to obtain an expression for the gradient, $\lambda_I$ and the quadratic error being a real value, in the form:

$$\lambda_I(t+1) = \lambda_I(t)+\mu_I \cdot \text{Re}\left(e(t+1) \cdot \frac{D_w^*(t+1)}{S'^*(t+1)} \cdot (I'(t+1-\tau)-I'(t+1))\right)$$

where $\mu_I$ is the stepsize of the gradient for $\lambda_I$.

In the same way for $\lambda_Q$, which is a real value, and because the quadratic error is also a real number, we have:

$$\lambda_Q(t+1) = \lambda_Q(t) + \mu_Q \cdot \text{Im}\left(e(t+1) \cdot \frac{D_w^*(t+1)}{S'^*(t+1)} \cdot (Q'(t+1-\tau) - Q'(t+1))\right)$$

where $\mu_Q$ is the stepsize of the gradient for $\lambda_Q$.

By proceeding likewise in relation to the weighting correction coefficients $\alpha_{I,I}$, $\alpha_{Q,Q}$, $\alpha_{I,Q}$ and $\alpha_{Q,I}$, the following expressions for the gradient are obtained:

$$\alpha_{I,I}(t+1) = \alpha_{I,I}(t) +$$
$$\mu_{I,I} \cdot \text{Re}\left(e(t+1) \cdot \frac{D_w^*(t+1)}{S'^*(t+1)} \cdot ((1-\lambda_I) \cdot I(t+1) + \lambda_I \cdot I(t+1-\tau))\right)$$

$$\alpha_{Q,I}(t+1) = \alpha_{Q,I}(t) +$$
$$\mu_{Q,I} \cdot \text{Re}\left(e(t+1) \cdot \frac{D_w^*(t+1)}{S'^*(t+1)} \cdot ((1-\lambda_I) \cdot Q(t+1) + \lambda_I \cdot Q(t+1-\tau))\right)$$

$$\alpha_{I,Q}(t+1) = \alpha_{I,Q}(t) +$$
$$\mu_{I,Q} \cdot \text{Im}\left(e(t+1) \cdot \frac{D_w^*(t+1)}{S'^*(t+1)} \cdot ((1-\lambda_Q) \cdot I(t+1) + \lambda_Q \cdot I(t+1-\tau))\right)$$

$$\alpha_{Q,Q}(t+1) = \alpha_{Q,Q}(t) +$$
$$\mu_{Q,Q} \cdot \text{Im}\left(e(t+1) \cdot \frac{D_w^*(t+1)}{S'^*(t+1)} \cdot ((1-\lambda_Q) \cdot Q(t+1) + \lambda_Q \cdot Q(t+1-\tau))\right)$$

where $\mu_{I,I}$, $\mu_{Q,Q}$, $\mu_{I,Q}$, $\mu_{Q,I}$ are respectively the stepsizes of the gradient for $\alpha_{I,I}$, $\alpha_{Q,Q}$, $\alpha_{I,Q}$ and $\alpha_{Q,I}$.

Provision may advantageously be made to update the parameters $\lambda_I$, $\lambda_Q$, $\alpha_{I,I}$, $\alpha_{Q,Q}$, $\alpha_{I,Q}$ and $\alpha_{Q,I}$ applied to the signal to be emitted only from time to time, for example every frame of the signal to be emitted if the signal to be emitted is transmitted by frames.

On the other hand, it is preferable to determine a current value of these parameters more frequently than the updating of these parameters so as to allow better convergence of the gradient algorithm used.

Other types of architectures of the emission chain may of course be implemented. In a general manner for these various types of architecture the same kind of approach as that described in the examples above may be used.

On the basis of a knowledge of the architecture of an emission chain, it is possible to put in place a correction according to an embodiment of the present invention.

In a preferred embodiment of the present innovation, these parameters are estimated by implementing a gradient algorithm.

The delay parameters may advantageously be determined by replacing them with linear interpolation parameters as is set forth hereinabove.

Certain emission chains having a power amplifier exhibit a distortion with regard to the linearity of the signal in the operating range of the power amplifier. Furthermore, in order to increase the efficiency of the power amplifier, it is conventional to use it in a zone of its operating range which is close to a saturation zone. However, this distortion is all the greater in such an operating zone.

Distortion such as this degrades the frequency spectrum of the signal emitted and may therefore disturb transmission in adjacent channels ("ACPR", standing for "Adjacent Channel Power Ratio").

It may therefore be advantageous, in emission chains of this type, to make provision to correct, in addition to the distortions stated above, which are related to an architecture of the emission chain, the distortions which are in fact related to the operation of the power amplifier.

For this purpose, provision is made to determine at the level of the signal comparison unit 209, in the architectures according to an embodiment of the present invention, as illustrated in FIGS. 3 to 5, parameters for correcting this type of distortion on the basis of a comparison of the input signal transmitted on the transmission pathway and of the signal to be emitted.

Figure 6:
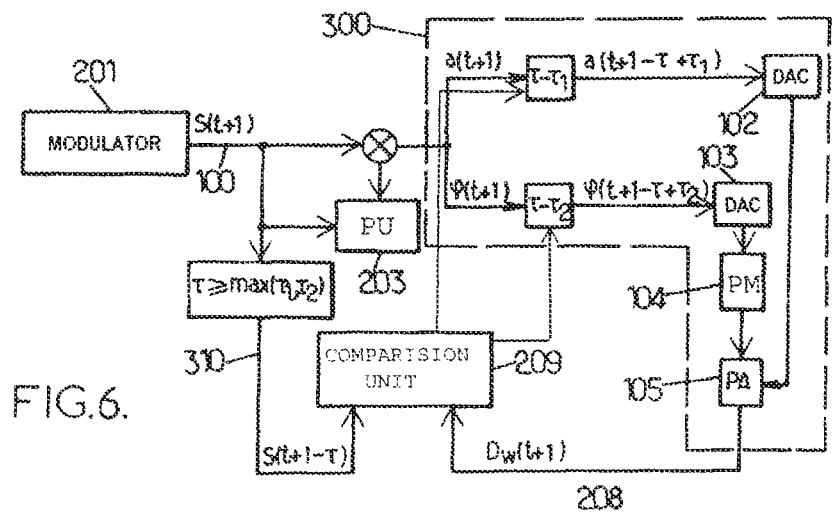
FIG. 6 illustrates an emission chain architecture such as that illustrated in FIG. 3 in which a pre-distortion is moreover applied in order to render the operation of the power amplifier linear.

FIG. 6 illustrates an emission chain architecture such as that illustrated in FIG. 3 in which a predistortion unit 203 is responsible for predistorting the signal before it is processed by the power amplifier by applying predistortion parameters.

In an embodiment of the present invention, based on decomposing the input signal into two components, provision may be made to apply the predistortion upstream of this decomposition, as illustrated by FIG. 6.

By proceeding thus, the distortions induced by the processing of the power amplifier may be anticipated on the signal provided to the power amplifier so that the amplified signal to be emitted at the output of the emission chain does not exhibit impairments relating to the power amplifier. The person skilled in the art is aware of suitable means for providing a predistorted modulated signal such as this as input to the decomposition module 101.

The invention claimed is:

1. A method of processing a signal in an emission chain for receiving a digital input signal and for providing the signal to be emitted; the digital input signal being decomposed into a plurality of digital delay components having a plurality of pathway-induced delays, including at least a first digital delay component having a first pathway-induced delay to generate a first digital delay signal and a second digital delay component having a second pathway-induced delay to generate a second digital delay signal, said method comprising the following steps:

(a) delaying the digital input signal by a third digital delay component to generate a third digital delay signal, the third digital delay signal having a value greater than or equal to the maximum value of each of the first and second digital delay signals;

(b) applying a correction delay to each of the first and second digital delay components, including applying a first correction delay to the first digital delay component to obtain the first digital delay signal and a second correction delay to the second digital delay component to obtain the second digital delay signal, the first correction delay and the second correction delay being derived from a comparison between the third digital delay signal and the signal to be emitted; and (c) obtaining the signal to be emitted from a power amplifier by converting the first and second digital delay signals into first and second analog signals, respectively, modulating the second analog signal to generate a phase modulated signal, and inputting the first analog signal and the phase modulated signal to the power amplifier.

2. The method of processing the signal according to claim 1, wherein the first and second digital delay components are derived by implementing a linear interpolation and in which linear interpolation coefficients are estimated on the basis of the comparison between the third digital delay signal and the signal to be emitted.

3. The method of processing the signal according to claim 2, wherein the linear interpolation coefficients are estimated by means of a gradient algorithm.

4. The method of processing the signal according to claim 1, wherein the first digital delay component and the second digital delay component are respectively an amplitude component and a phase component.

5. The method of processing the signal according to any one of claims 1, 2, 3 and 4, wherein the first and second digital delay components are respectively in-phase and quadrature phase components (I, Q).

6. An emission chain for processing a signal suitable for receiving a digital input signal and for providing the signal to be emitted, the digital input signal being decomposed into a plurality of digital delay components having associated pathway-induced delays including at least a first digital delay component having a first pathway-induced delay configured to generate a first digital delay signal and a second digital delay component configured to generate a second digital delay signal; said emission chain comprising:

a processing pathway comprises the first digital delay component configured to generate the first digital delay signal, the second digital delay component configured to generate the second digital delay signal, first and second converters configured to convert the first and second digital delay signals into first and second analog signals, respectively, a phase modulator configured to modulate the second analog signal to generate a phase modulated signal, and a power amplifier configured to receive the first analog signal and the phase modulated signal to generate the signal to be emitted; and a signal transmission pathway configured to delay the digital input signal by a third digital delay component to generate a third digital delay signal to a comparison unit, said third digital delay signal having a value greater than or equal to the maximum value of each of the first and second digital delay signals, wherein said comparison unit compares the signal to be emitted and the third digital delay signal to generate a comparison signal to the first and second digital delay components.

7. The emission chain for processing the signal according to claim 6, wherein the comparison unit implements a linear interpolation by estimating linear interpolation coefficients to generate the comparison signal to the first and second digital delay components.

8. The emission chain for processing the signal according to claim 7, wherein the linear interpolation coefficients are determined by means of a gradient algorithm.

9. The emission chain for processing the signal according to claim 6, wherein the first digital delay component and the second digital delay component are respectively an amplitude component and a phase component.

10. The emission chain for processing the signal according to any one of claims 6, 7 and 8, wherein the first and second digital delay components are respectively in-phase and quadrature phase components (I, Q).

* * * * *